United States Patent
Suzuki

(10) Patent No.: US 8,623,529 B2
(45) Date of Patent: Jan. 7, 2014

(54) METHOD OF PRODUCING A PERPENDICULAR MAGNETIC RECORDING MEDIUM AND PERPENDICULAR MAGNETIC RECORDING MEDIUM

(75) Inventor: Kouta Suzuki, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 353 days.

(21) Appl. No.: 12/935,215

(22) PCT Filed: Mar. 24, 2009

(86) PCT No.: PCT/JP2009/055794
§ 371 (c)(1),
(2), (4) Date: Dec. 21, 2010

(87) PCT Pub. No.: WO2009/122963
PCT Pub. Date: Oct. 8, 2009

(65) Prior Publication Data
US 2011/0102944 A1    May 5, 2011

(30) Foreign Application Priority Data
Mar. 29, 2008 (JP) ................................. 2008-088875

(51) Int. Cl.
*G11B 5/66*    (2006.01)
(52) U.S. Cl.
USPC .................. 428/833.6; 428/835.7; 428/835.8; 428/844; 428/841.3
(58) Field of Classification Search
USPC .......... 428/835.7, 835.6, 835.8, 843.3, 833.3, 428/833.6, 833.7, 833.8; 29/898.1; 508/104, 138, 181
See application file for complete search history.

(56) References Cited

U.S. PATENT DOCUMENTS

| 5,508,061 | A | * | 4/1996 | Yanagisawa | 427/127 |
| 2003/0224212 | A1 | * | 12/2003 | Sonoda et al. | 428/694 R |
| 2007/0196698 | A1 | * | 8/2007 | Ishiyama | 428/834 |

FOREIGN PATENT DOCUMENTS

| JP | 02-073519 A | 3/1990 |
| JP | 10-218803 A | 8/1998 |
| JP | 11-066555 A | 3/1999 |
| JP | 2001-229529 A | 8/2001 |

OTHER PUBLICATIONS

Mathew C. Mate et al, "Roughness of Thin Perfluoropolyether Lubricant Films: Influence on Disk Drive Technology", IEEE Transactions on Magnetics, Vol. 37, No. 4, Jul. 2001, pp. 1821-1823 (3 pages).
International Written Opinion for PCT Application No. PCT/JP2009/055794, mailed on Feb. 6, 2009, in 14 pages.
International Preliminary Report on Patentability for PCT Application No. PCT/JP2009/055794, mailed on Nov. 9, 2010, in 15 pages.

* cited by examiner

*Primary Examiner* — Michael Cleveland
*Assistant Examiner* — Tabassom Tadayyon Eslami

(57) ABSTRACT

An object of the present invention is to provide a perpendicular magnetic recording medium including a suitable lubricating layer with sufficient durability, moisture resistance, and contamination resistance and also maintaining an R/W characteristic. In a typical structure of the present invention, a method of manufacturing a perpendicular magnetic recording medium 100 including a magnetic recording layer 122, a medium protective layer 126, and a lubricating layer 128 in this order on a base 110 includes: a CF bond density measuring step of measuring a CF bond density of a lubricant; and a lubricating layer forming step of forming a lubricating layer with the lubricant when the measured CF bond density is $2.0\times10^{22}$ to $2.7\times10^{22}$ atoms/cm$^3$.

4 Claims, 5 Drawing Sheets

Z DOL : X = OH

METHOD OF PRODUCING A PERPENDICULAR MAGNETIC RECORDING MEDIUM AND PERPENDICULAR MAGNETIC RECORDING MEDIUM

TECHNICAL FIELD

The present invention relates to a method of manufacturing a perpendicular magnetic recording medium and a perpendicular magnetic recording medium implemented on an HDD (hard disk drive) of a perpendicular magnetic recording type or the like.

BACKGROUND ART

With an increase in capacity of information processing in recent years, various information recording technologies have been developed. In particular, the surface recording density of an HDD using magnetic recording technology is continuously increasing at an annual rate of approximately 100%. In recent years, an information recording capacity exceeding 160 GB per one magnetic disk with a 2.5-inch diameter for use in an HDD or the like has been desired. To fulfill such demands, an information recording density exceeding 250 Gbits per one square inch is desired to be achieved.

To attain a high recording density in a magnetic disk for use in an HDD or the like, a magnetic disk of a perpendicular magnetic recording type has been suggested in recent years. In a conventional in-plane magnetic recording type, the axis of easy magnetization of a magnetic recording layer is oriented in a plane direction of a base surface. In the perpendicular magnetic recording type, by contrast, the axis of easy magnetization is adjusted so as to be oriented in a direction perpendicular to the base surface. In the perpendicular magnetic recording type, compared with the in-plane recording type, the demagnetizing field (Hd) increases as magnetic particles are finer to improve a coercivity Hc, thereby allowing a heat fluctuation phenomenon to be suppressed. Therefore, the perpendicular magnetic recording type is suitable for increasing recording density.

A conventional magnetic disk for magnetic recording is configured of a substrate made of aluminum, glass, or the like, a magnetic recording layer for magnetic recording, and a carbon-made medium protective layer (carbon protective layer) and a lubricating layer for the purpose of ensuring reliability of the magnetic disk.

In recent years, with an increase in recording density, the floating amount between the magnetic head and the disk decreases. For example, as one technique for stabilizing the control of the floating amount of the magnetic head and achieving a further decrease of the floating amount, a technique called DFH (Dynamic Flying Height) has been developed (for example, Non-Patent Document 1). According to DFH, a heater element is embedded in a magnetic head, and the heater element is caused to generate heat at the time of operation of the magnetic head. With that heat, the magnetic head thermally expands to slightly protrude toward the magnetic disk. With this, only at that moment, a magnetic spacing, which is a magnetic gap, between the magnetic head and the main surface of the magnetic disk can be decreased. That is, DFH is a technology capable of decreasing the floating amount of the magnetic head from the magnetic disk.

With this DFH head, a further decrease of the floating amount can be achieved. However, the magnetic head has an MR element mounted thereon, which disadvantageously causes a head crush failure or a thermal asperity failure as a unique failure. Also, even when these failures are not caused, intermittent contacts between the magnetic head and the disk are assumed to increase in the future.

For this reason, demands for decreasing the coefficient of friction of the surface of the lubricating layer have increased. This is because, when a contact occurs, it is desired to decrease a damage to the magnetic head and the disk to improve durability and also to decrease wear of the carbon-made medium protective layer even if only slightly.

In addition, typically in the case of mounting (vehicle-mounting) on a passenger automobile, the environment where an HDD device is adopted has also become extremely severe, such as high temperatures and humidity. Under this environment, contamination of the disk is serious, and it is important to take measures for a highly-active carbon protective layer.

Non-Patent Document 1: Myokan, "2.5-inch Hard Disk Drives for Mobile Equipment", magazine FUJITSU, Volume 58, No. 1, pp. 10-15, FUJITSU Limited, January 2007.

SUMMARY OF INVENTION

Problems to be Solved by the Invention

However, if the thickness of the lubricating layer is increased too much for the purpose of improving durability, moisture resistance, and contamination resistance, an R/W characteristic (read/write characteristic) cannot be kept. In this manner, durability and others and the R/W characteristic have a trade-off relation. Therefore, it is required to achieve the purpose as to durability and others while ensuring the R/W characteristic with a film thickness as thin as possible.

In the conventional lubricant development, however, since the lubricating layer itself is made as an extremely thin film, it is extremely difficult to evaluate whether the carbon protective layer is coated with a lubricating layer having a sufficient film thickness to protect the carbon protective layer from damages.

In view of such a problem above, an object of the present invention is to provide a method of manufacturing a perpendicular magnetic recording medium having sufficient durability, moisture resistance, and contamination resistance and also including a suitable lubricating layer maintaining an R/W characteristic, and the perpendicular magnetic recording medium.

Means for Solving the Problem

To solve the above problem, the inventors note a CF (carbon-fluorine) bond density of a lubricant configuring a lubricating layer. This is because it is known that as the CF bond density is higher, the coefficient of friction of the lubricating layer is decreased.

Also, regarding the lubricating layer, as its film thickness is increased, surface free energy is decreased and contamination resistance is increased. This is because, with the lubricating layer having its thickness increased, the medium protective layer therebelow is totally coated and therefore the property of the highly-active medium protective layer is less prone to appear on a main surface of the medium. However, even with lubricating layers having the same film thickness, as the CF bond density is higher, surface free energy is lower. That is, the inventors note that a lubricant having a higher bond density can acquire a sufficient contamination resistance with a slighter film thickness and, due to such a thin film thickness, the R/W characteristic can also be maintained.

To solve the above problem, in a typical structure of the present invention, a method of manufacturing a perpendicular magnetic recording medium including a magnetic recording layer, a medium protective layer, and a lubricating layer in this order on a base includes: a CF bond density measuring step of measuring a CF bond density of a lubricant; and a lubricating layer forming step of forming a lubricating layer with the lubricant when the measured CF bond density is $2.0 \times 10^{22}$ to $2.7 \times 10^{22}$ atoms/cm$^3$.

According to the above structure, the lubricant with its CF bond density being within the above range has a sufficiently low coefficient of friction, and therefore a damage to the head and the disk when the magnetic head and the disk make contact with each other is small. Also, the lubricating layer formed with this lubricant has a low surface free energy. Therefore, compared with a material having a low CF bond density, with a slight film thickness, it is possible to form a surface having a sufficiently high contamination resistance while maintaining the R/W characteristic.

In the CF bond density measuring step, an ellipsometer or X-Ray Reflectivity (XRR) may be used to measure a film thickness of the lubricating layer, Fourier Transform Infrared Spectroscopy (FT-IR) or X-ray Photoelectron Spectroscopy (XPS) may be used to count the number of CF bonds in a predetermined range of the lubricating layer, and the CF bond density may be calculated based on the measured film thickness and the counted number of CF bonds (CF bond density measuring step).

According to an ellipsometer or XRR, the film thickness of the lubricating layer can be measured. According to FT-IR or XPS, the number of CF bonds included in a predetermined range (area) can be found. Therefore, a CF bond density can be calculated from the number of CF bonds included in a predetermined volume. The CF density changes with the type, film thickness, applying method, and others of the lubricant and, most of all, greatly changes with the type of the lubricant.

The ellipsometer is a technique of calculating each film thickness by using a refractive index of each layer. The ellipsometer measures changes of a polarizing state of incident light and reflected light of light on a glass substrate or thin-film surface and, based on data obtained from the measurement, calculates a film thickness and a refractive index of the thin film. A measurement can be easily performed with high accuracy without contact or destruction.

XRR uses a reflection coefficient of an X ray, and can determine film thicknesses of density-varying layers with high accuracy.

FT-IR is a spectroscopy of measuring absorption of infrared light. By representing information about thermal oscillation of molecular bonds in a physical sense and observing oscillation extension and contraction of CF bonds in the lubricating film, the number of CF bonds can be determined.

XPS is a technique of measuring photoelectrons occurring from inner shells of an atom due to an X ray. In lubricating layer analysis, photoelectrons occurring from fluorine (1S inner shell orbit) is analyzed and determined.

The above lubricant may be of perfluoropolyether. Perfluoropolyether is a fluorine-type synthetic oil in which O is interposed between C—F$_2$ as a basis, is excellent in heat resistance and chemical resistance, and has a high viscosity index.

In another typical structure of the present invention, in a perpendicular magnetic recording medium including a magnetic recording layer, a medium protective layer, and a lubricating layer in this order on a base, the lubricating layer has a CF bond density of $2.0 \times 10^{22}$ to $2.7 \times 10^{22}$ atoms/cm$^3$ calculated based on a film thickness of the lubricating layer measured by using an ellipsometer or X-ray Photoelectron Spectroscopy and the number of CF bonds in a predetermined range of the lubricating layer counted by using Fourier Transform Infrared Spectroscopy or X-ray Photoelectron Spectroscopy.

Components and description thereof corresponding to a technical idea in the method of manufacturing a perpendicular magnetic recording medium described above are also applicable to the perpendicular magnetic recording medium.

Effect of the Invention

As described above, according to the present invention, in a perpendicular magnetic recording medium with a decreased floating amount by adopting DFH or the like, it is possible to manufacture a perpendicular magnetic recording medium including a lubricating layer with sufficient durability, moisture resistance, and contamination resistance, suppressing the coefficient of friction low, and also maintaining an R/W characteristic, which has a trade-off relation thereof.

DESCRIPTION OF REFERENCE NUMERALS

Figure 1:
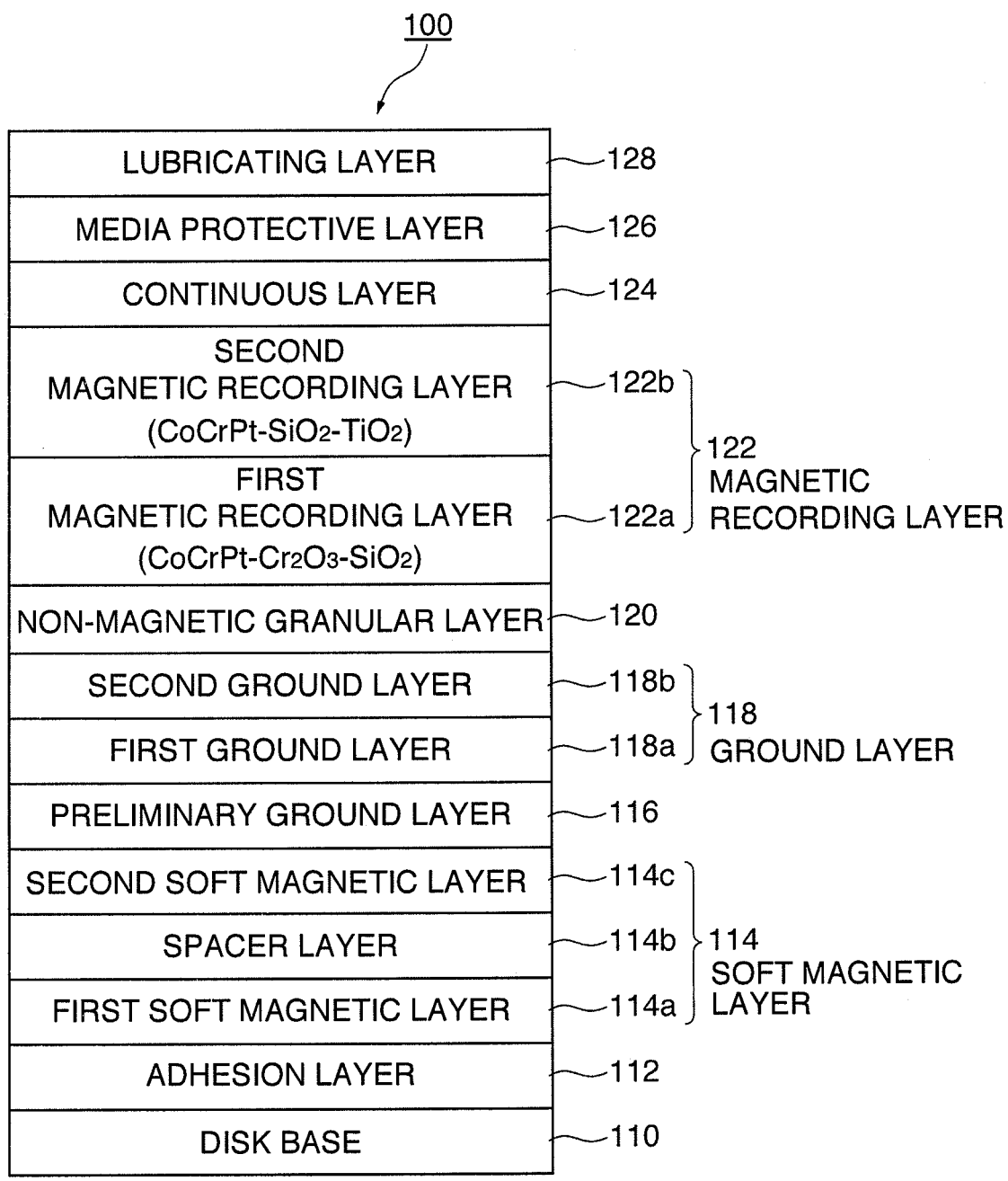
[FIG. 1] A diagram for describing the structure of a perpendicular magnetic recording medium according to an embodiment.

100 . . . perpendicular magnetic recording medium
110 . . . disk base
112 . . . adhesion layer
114a . . . first soft magnetic layer
114b . . . spacer layer
114c . . . second soft magnetic layer
116 . . . preliminary ground layer
118 . . . ground layer
118a . . . first ground layer
118b . . . second ground layer
120 . . . non-magnetic granular layer
122 . . . magnetic recording layer
122a . . . first magnetic recording layer
122b . . . second magnetic recording layer
124 . . . continuous layer
126 . . . medium protective layer
128 . . . lubricating layer

BEST MODE FOR CARRYING OUT THE INVENTION

In the following, with reference to the attached drawings, preferred embodiments of the present invention are described in detail. The dimensions, materials, and others such as specific numerical values shown in these embodiments are merely examples so as to facilitate understanding of the invention, and are not meant to restrict the present invention unless otherwise specified. Note that, in the specification and drawings, components having substantially the same functions and structures are provided with the same reference characters and are not redundantly described, and components not directly relating to the present invention are not shown in the drawings.

Embodiments

An embodiment of the method of manufacturing a perpendicular magnetic recording medium according to the present invention is described. FIG. 1 is a diagram for describing the structure of a perpendicular magnetic recording medium 100 according to the present embodiment. The perpendicular magnetic recording medium 100 depicted in FIG. 1 is configured of a disk base 110, an adhesion layer 112, a first soft magnetic layer 114a, a spacer layer 114b, a second soft magnetic layer 114c, a preliminary ground layer 116, a first ground layer 118a, a second ground layer 118b, a non-magnetic granular layer 120, a first magnetic recording layer 122a, a second magnetic recording layer 122b, a continuous layer 124, a medium protective layer 126, and a lubricating layer 128. Note that the first soft magnetic layer 114a, the spacer layer 114b, and the second soft magnetic layer 114 together form a soft magnetic layer 114. The first ground layer 118a and the second ground layer 118b together form a ground layer 118. The first magnetic recording layer 122a and the second magnetic recording layer 122b together form a magnetic recording layer 122.

For the disk base 110, a glass disk molded in a disk shape by direct-pressing amorphous aluminosilicate glass can be used. Note that the type, size, thickness, and others of the glass disk are not particularly restricted. A material of the glass disk can be, for example, aluminosilicate glass, soda lime glass, soda alumino silicate glass, aluminoborosilicate glass, borosilicate glass, quartz glass, chain silicate glass, or glass ceramic, such as crystallized glass. This glass disk is sequentially subjected to grinding, polishing, and chemical strengthening, thereby allowing the smooth, non-magnetic disk base 110 made of chemically-strengthened glass disk to be obtained.

Note that, as the disk base 110, aluminum may be used in place of glass.

On the disk base 110, the adhesion layer 112 to the continuous layer 124 are sequentially formed by DC magnetron sputtering, and the medium protective layer 126 can be formed by CVD. Then, the lubricating layer 128 can be formed by dip coating.

The structure of each layer and its manufacturing method are described below. In the present embodiment, an in-line-type film forming method with high productivity is used.

The adhesion layer 112 is an amorphous ground layer formed in contact with the disk base 110, and includes a function of increasing a peel strength between the soft magnetic layer 114 formed on this layer and the disk base 110 and a function of making crystal grains of each layer formed on this layer finer and more uniform. When the disk base 110 is made of amorphous glass, the adhesion layer 112 is preferably an amorphous alloy film so as to comply with that amorphous glass surface.

As the adhesion layer 112, for example, any can be selected from a CrTi-type amorphous layer, a CoW-type amorphous layer, a CrW-type amorphous layer, a CrTa-type amorphous layer, and a CrNb-type amorphous layer. Among all, a CrTi-type alloy film is particularly preferable because of forming an amorphous metal film containing microcrystallines. The adhesion layer 112 may be a single layer formed of a single material, but may be formed by multilayering a plurality of layers. For example, a CoW layer or a CrW layer may be formed on a CrTi layer. Also, preferably, these adhesion layers 112 are subjected to sputtering with a material containing carbon dioxide, carbon monoxide, nitrogen, or oxygen, or have their surface layer exposed in any of these gases.

The soft magnetic layer 114 is a layer in which a magnetic path is temporarily formed at the time of recording so as to let a magnetic flux pass through a recording layer in a perpendicular direction in a perpendicular magnetic recording type. By interposing the non-magnetic spacer layer 114b between the first soft magnetic layer 114a and the second soft magnetic layer 114c, the soft magnetic layer 114 can be configured to include Antiferro-magnetic exchange coupling (AFC). With this, magnetizing directions of the soft magnetic layer 114 can be aligned with high accuracy along the magnetic path (magnetic circuit), the number of perpendicular components in the magnetizing direction becomes extremely small, and therefore noise occurring from the soft magnetic layer 114 can be reduced. As the composition of the first soft magnetic layer 114a and the second soft magnetic layer 114c, a cobalt-type alloy, such as CoTaZr; a Co—Fe-type alloy, such as CoCrFeB; a Ni—Fe-type alloy having a [Ni—Fe/Sn]n multilayered structure or the like can be used.

The preliminary ground layer 116 is a non-magnetic alloy layer, and includes an operation of protecting the soft magnetic layer 114 and a function of orienting in a disk perpendicular direction an easy axis of magnetization of a hexagonal close-packed structure (hcp structure) included in the ground layer 118 formed on the preliminary ground layer. In the preliminary ground layer 116, a (111) surface of a face-centered cubic structure (fcc structure) are preferably parallel to a main surface of the disk base 110. Also, the preliminary ground layer 116 may have a structure in which these crystal structures and amorphous are mixed. As a material of the preliminary ground layer 116, a selection can be made from Ni, Cu, Pt, Pd, Zr, Hf, Nb, and Ta. Furthermore, an alloy including any of these metals as a main element and any one or more additional elements from among Ti, V, Ta, Cr, Mo, and W may be used. For example, NiW, CuW, or CuCr can be suitably selected.

The ground layer 118 has a hcp structure, and has an operation of growing crystals of the hcp structure of the magnetic recording layer 122 as a granular structure. Therefore, as the crystal orientation of the ground layer 118 is higher, that is, a (0001) surface of a crystal of the ground layer 118 is more parallel to the main surface of the disk base 110, the orientation of the magnetic recording layer 122 can be improved. As a material of the ground layer 118, Ru is typical. Other than that, a selection can be made from RuCr and RuCo. Ru has a hcp structure, and a lattice space of the crystal is similar to that of Co. Therefore, the magnetic recording layer 122 having Co as a main component can be oriented in good condition.

When the ground layer 118 is made of Ru, by changing the gas pressure at the time of sputtering, a two-layer structure made of Ru can be achieved. Specifically, when the second ground layer 118b on an upper-layer side is formed, the gas pressure of Ar is made higher than that when the first ground layer 118a on a lower-layer side is formed. When the gas pressure is made higher, a free traveling distance of plasma ions to be sputtered is shortened, and therefore the film-forming speed becomes slow, thereby improving the crystal separation ability. Also, with a high pressure, the size of the crystal lattice becomes smaller. Since the size of the crystal lattice of Ru is larger than that of the crystal lattice of Co, when the crystal lattice of Ru is made smaller, it becomes closer to that of Co, thereby further improving the crystal orientation of the Co granular layer.

The non-magnetic granular layer 120 is a non-magnetic granular layer. By forming a non-magnetic granular layer on the hcp crystal structure of the ground layer 118 and, on that layer, making a granular layer of the first magnetic recording layer 122a grown, an operation of separating the magnetic granular layer from a stage of initial growth (leading) is provided. The composition of the non-magnetic granular layer 120 can be a granular structure by forming a grain boundary by causing segregation of non-magnetic substance between non-magnetic crystal grains made of a Co-type alloy. In particular, CoCr—$SiO_2$ and CoCrRu—$SiO_2$ can be suitably used and, furthermore, in place of Ru, Rh (rhodium), Pd (palladium), Ag (silver), Os (osmium), Ir (iridium), and Au (gold) can also be used. Still further, the non-magnetic substance is a substance in which a grain boundary part can be formed around magnetic particles so that an exchange interaction operation between magnetic particles (magnetic grains) is suppressed or interrupted, and can be any as long as it is a non-magnetic substance that is not incorporated into cobalt (Co). Examples can include silicon oxide ($SiO_x$), chrome (Cr), chrome oxide ($CrO_2$), titanium oxide ($TiO_2$), zircon oxide ($ZrO_2$), and tantalum oxide ($Ta_2O_5$).

The magnetic recording layer 122 is a ferromagnetic layer having a granular structure in a columnar shape in which a grain boundary is formed by causing segregation of a non-magnetic substance around magnetic particles made of a hard magnetic body selected from a Co-type alloy, a Fe-type alloy, and a Ni-type alloy. By providing the non-magnetic granular layer 120, these magnetic particles can make an epitaxial growth continuously from their granular structure. In the present embodiment, the magnetic recording layer is configured of the first magnetic recording layer 122a and the second magnetic recording layer 122b different in composition and film thickness. In both of the first magnetic recording layer 122a and the second magnetic recording layer 122b, as a non-magnetic substance, an oxide, such as $SiO_2$, $Cr_2O_3$, $TiO_2$, $B_2O_3$, and $Fe_2O_3$; a nitride, such as BN; or a carbide, such as $B_4C_3$ can be suitably used.

The continuous layer 124 is a magnetically continuous layer (also referred to as a continuous layer) in an in-plane direction on the magnetic recording layer 122 having a granular structure. Although the continuous layer 124 is not necessarily required, by providing this, in addition to a high-density recording property and a low-noise property of the magnetic recording layer 122, it is possible to enhance the inverted-magnetic-domain nucleation magnetic field Hn, improve the heat-resistant fluctuation characteristic, and improve the overwrite characteristic.

Here, instead of being a single layer, the continuous layer 124 may have a CGC structure (Coupled Granular Continuous) in which thin films (continuous layers) demonstrating a high perpendicular magnetic anisotropy and a high saturation magnetization MS are formed. Here, the CGC structure can be configured of a magnetic recording layer having a granular structure, a thin-film coupling control layer made of a non-magnetic substance, such as Pd or Pt, and an exchange energy control layer formed of an alternate multilayer film having CoB and Pd thin films multilayered.

The medium protective layer 126 can be formed by forming a film out of carbon by CVD while keeping a vacuum state. The medium protective layer 126 is a protective layer for protecting the perpendicular magnetic recording layer from a shock of the magnetic head. In general, a carbon film formed by CVD has an improved film hardness compared with the one formed by sputtering, and therefore the magnetic recording layer 122 can be more effectively protected from a shock from the magnetic head. The top surface of the medium protective layer 126 was subjected to nitrogen processing.

The medium protective layer 126 may be formed by FCVA (Filtered Cathodic Vacuum Arc) or IBD (Ion Beam Deposition).

The lubricating layer 128 can be formed by forming a film out of perfluoropolyether (PFPE) by dip coating. PFPE has a molecular structure in a long chain shape, and is coupled to an N atom on the surface of the medium protective layer 126 with high affinity. With this operation of the lubricating layer 128, a damage or loss of the medium protective layer 126 can be prevented even if the magnetic head makes contact with the surface of the perpendicular magnetic recording medium 100.

Figure 2:
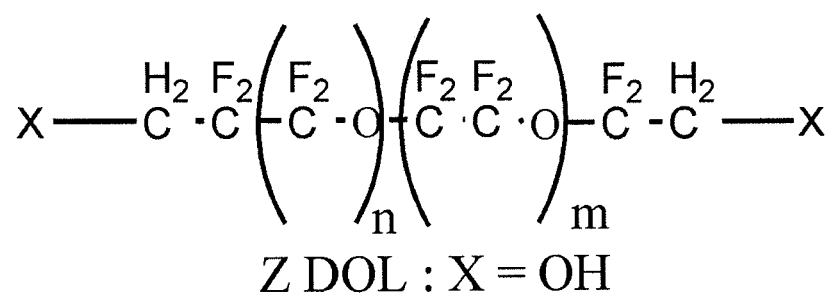
[FIG. 2] A diagram of a chemical formula of a Fomblin Z-type lubricant used as a lubricant of FIG. 1.

As a material of the lubricating layer 128, more specifically, Fomblin Z ("Fomblin" is a registered trademark)-type lubricant (such as Fomblin Z DOL or Fomblin Z TETRAOL) was used. FIG. 2 is a diagram of a chemical formula of a Fomblin Z-type lubricant that can be used as a lubricant of FIG. 1. The molecular mass (typically, 1000 to 2000) is determined based on the number of main-chain units of two types (portions with suffixes of n and m) included in a lubricant molecule.

Figure 3:
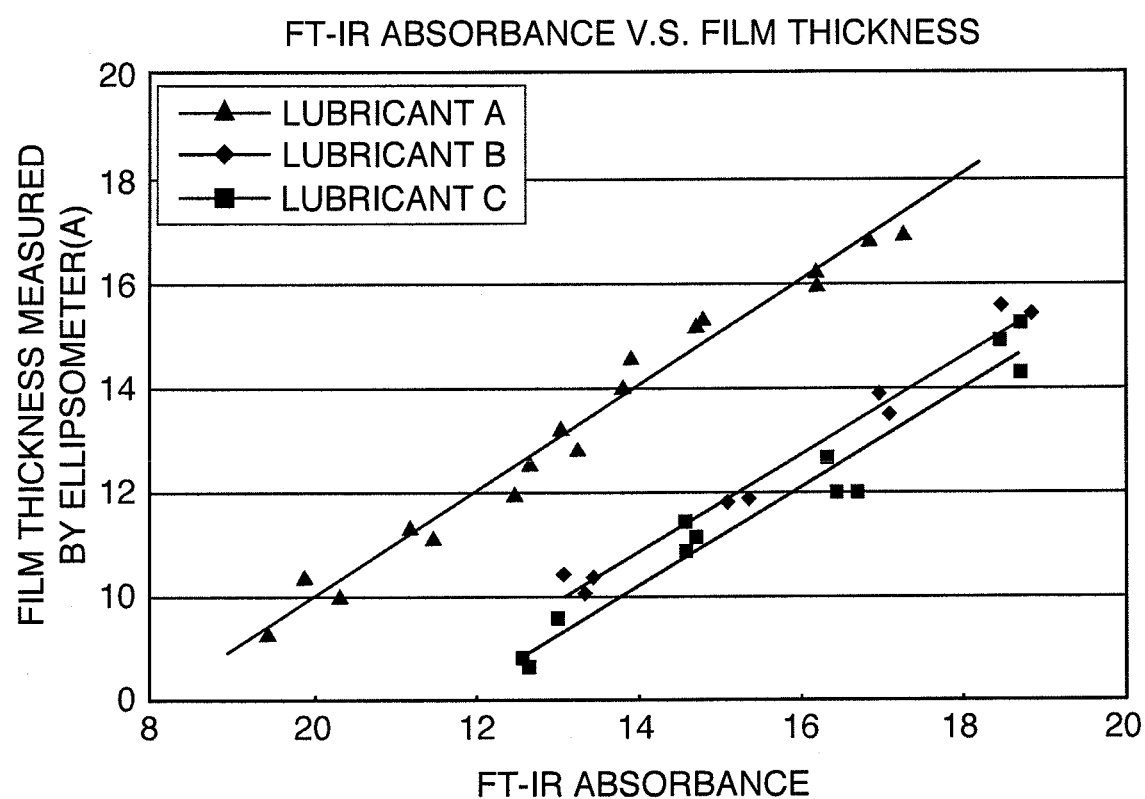
[FIG. 3] A graph of a relation between the film thicknesses when various lubricants are applied and absorbances in a predetermined range (area).

FIG. 3 is a graph of a relation between the film thicknesses of various lubricants and FT-IR absorbances in a predetermined range (area). In FIG. 3, the film thickness is measured by an ellipsometer, but may be measured by XRR. Also, based on an FT-IR absorbance in a predetermined range, the number of CF bonds included in that range can be found. In FIG. 3, measurements are performed by FT-IR, but may be performed by XPS.

By multiplying the film thickness on the vertical axis by a spot area unique to the ellipsometer, a predetermined volume to be measured can be obtained. The number of CF bonds included in this volume is given by the horizontal axis. Therefore, by dividing the number of CF bonds by the above volume, the CF bond density of the lubricant can be calculated.

In FIG. 3, all lubricants are Fomblin-type lubricants, and a line on the left represents a lubricant A, a line at the center represents a lubricant B, and a line on the right represents a lubricant C. When the results of counting the number of CF bonds by FT-IR are compared in the case where film thicknesses measured by an ellipsometer are the same (that is, physical film thicknesses are the same), the number represented by the line of the lubricant A is more than that represented by the line of the lubricant B, and the number represented by the line of the lubricant C is further more. That is, the line of the lubricant C represents the highest CF bond density.

Figure 4:
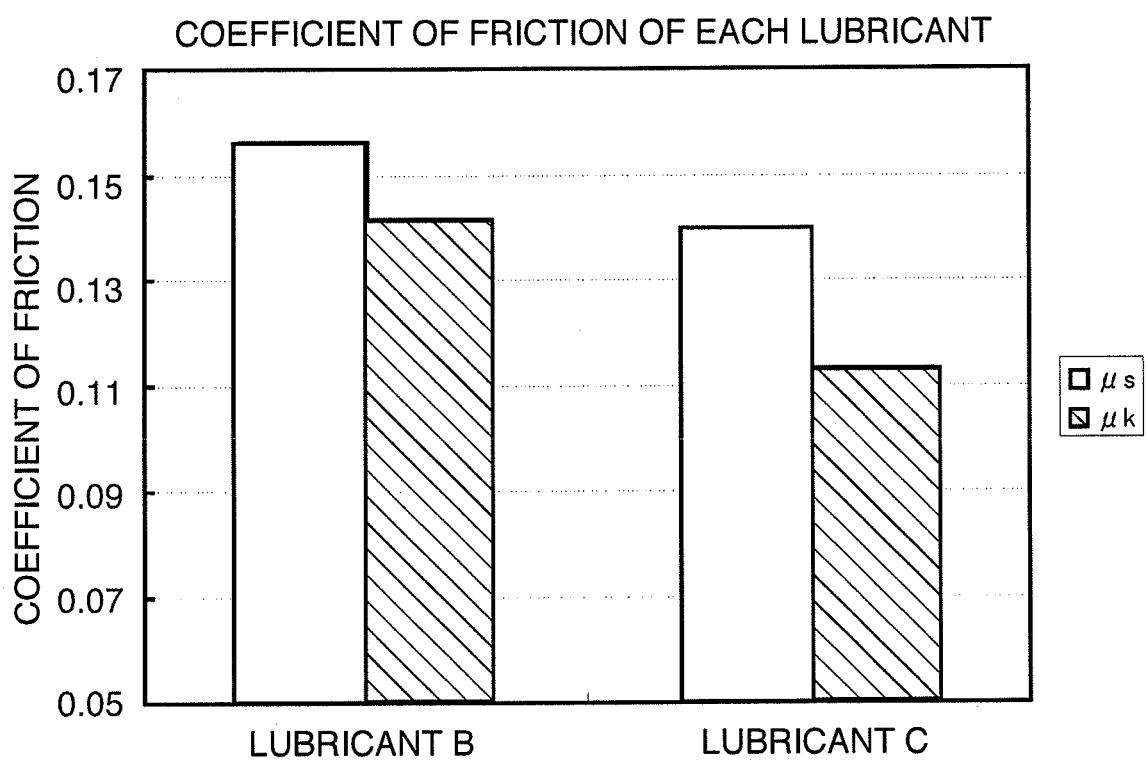
[FIG. 4] A bar chart obtained by comparing the coefficients of friction of a lubricant B and a lubricant C of FIG. 3.

When the calculated CF bond density is $2.0 \times 10^{22}$ to $2.7 \times 10^{22}$ atoms/$cm^3$, the lubricating layer 128 is formed with that lubricant (lubricating layer forming step). This is because the lubricant having a CF bond density falling within the above range has a sufficiently-low coefficient of friction and therefore a damage to the head and the disk when the magnetic head and the disk make contact with each other is small. FIG. 4 is a bar chart obtained by comparing the coefficients of friction of the lubricant B and the lubricant C of FIG. 3. As depicted in FIG. 4, compared with the lubricant B, the lubricant C with a higher CF bond density has a smaller coefficient of static friction, $\mu_s$, and a smaller coefficient of kinetic friction, $\mu_k$, and is excellent when used as the lubricating layer 128. In other words, a lubricant having more CF bonds, which are thought to be advantageous in wear resistance, in the film is thought to be more advantageous.

Figure 5:
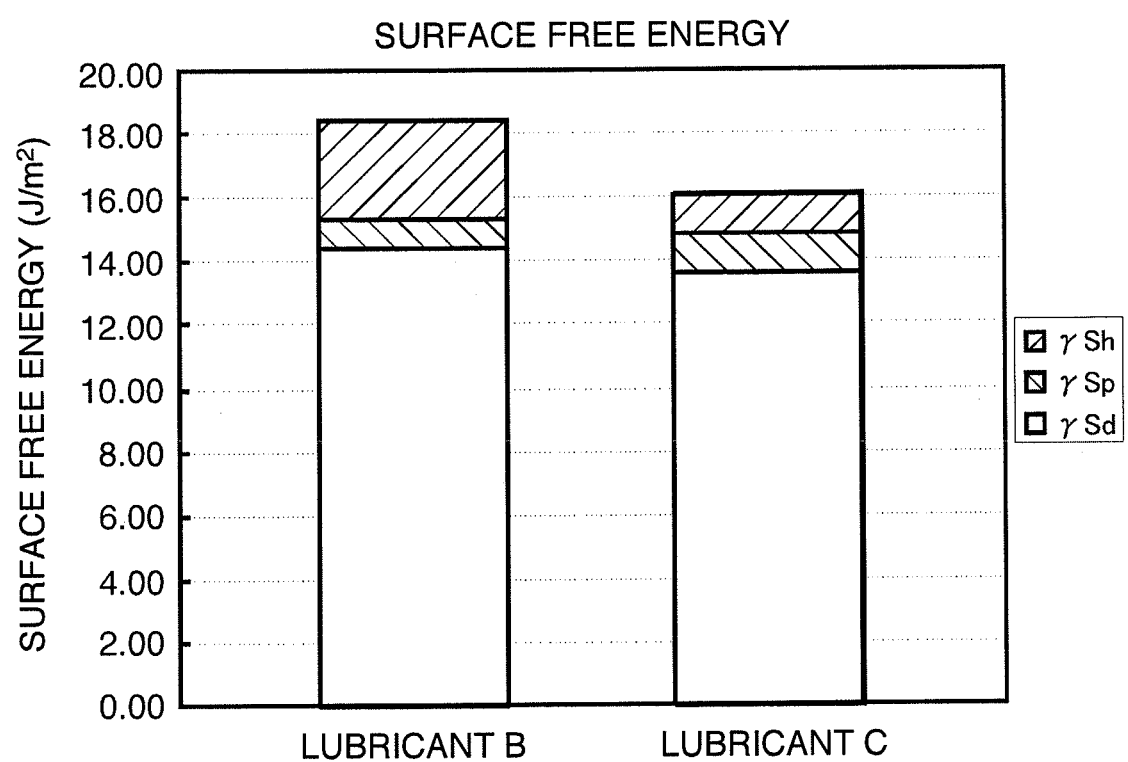
[FIG. 5] A bar chart obtained by comparing surface free energies of the refined lubricant B and the lubricant C, whose coefficients of friction are compared in FIG. 4.

FIG. 5 is a bar chart obtained by comparing surface free energies of the lubricant B and the lubricant C, whose coefficients of friction are compared in FIG. 4. As depicted in FIG. 5, the surface free energy includes a surface free energy derived from hydrogen bond, γsh, a surface free energy derived from polarity components, γsp, and a surface free energy derived from dispersion components, γsd. A total of these three types of components forms a surface free energy of the entire surface.

Since a CF bond is chemically stable, as depicted in FIG. 5, a lubricating layer C formed with the lubricant having a high CF bond density can decrease the surface free energy compared with a lubricating layer B and, compared with a material having a low CF bond density, while maintaining the R/W characteristic with a slight film thickness, a surface with a sufficiently-high contamination resistance can be formed.

With the above manufacturing processes, the perpendicular magnetic recording medium 100 can be obtained. In the following, effectiveness of the present invention is described by using an example and comparative examples.

Example

As an example, by using a vacuumed film forming device, the adhesion layer 112 to the continuous layer 124 were sequentially formed on the disk base 110 in an Ar atmosphere by DC magnetron sputtering. The adhesive layer 112 was of CrTi. In the soft magnetic layer 114, the composition of the first soft magnetic layer 114a and the second soft magnetic layer 114c was of CoCrFeB, and the composition of the spacer layer 114b was of Ru. The composition of the preliminary ground layer 116 was of an NiW alloy with an fcc structure. In the ground layer 118, the first ground layer 118a was formed out of Ru under high-pressure Ar, and the second ground layer 118b was formed out of Ru under low-pressure Ar. The composition of the non-magnetic granular layer 120 was of non-magnetic CoCr—$SiO_2$. The composition of the magnetic recording layer 122 was as depicted in FIG. 1. The composition of the continuous layer 124 was of CoCrPtB. As for the medium protective layer 126, a film was formed by using $C_2H_4$ and CN by CVD, and the top surface of the medium protective layer was subjected to nitrogen processing. The lubricating layer 128 was formed by using a PFPE-type lubricant by dip coating. The lubricant used is the lubricant C. After film formation, a heat treatment was performed at a predetermined temperature.

Comparative Examples

On the other hand, as each comparative example, the lubricating layer 128 was formed by using the lubricant B. After film formation, a heat treatment was performed at a predetermined temperature, and three comparative examples with heating times of 30 minutes, 60 minutes, and 120 minutes were manufactured. Then, as a result of a comparison between the example and each of the comparison examples, as depicted in FIG. 4 and FIG. 5, it was confirmed that both of the measured coefficients of friction and surface free energies in the comparison examples were lower than those in the example.

In the foregoing, the preferred examples of the present invention have been described with reference to the attached drawings. Needless to say, however, the present invention is not restricted by such examples. It is clear that the person skilled in the art can conceive various modification examples or corrected examples within a range described in the scope of claims for patent, and it is understood that these examples reasonably belong to the technological scope of the present invention.

For example, although a perpendicular magnetic recording type disk is used in the present embodiment, the present invention is usable for an in-plane magnetic recording type disk.

INDUSTRIAL APPLICABILITY

The present invention can be utilized as a method of manufacturing a perpendicular magnetic recording medium mounted on an HDD (hard disk drive) or the like of perpendicular magnetic recording type, and the perpendicular magnetic recording medium.

The invention claimed is:

1. A method of manufacturing a perpendicular magnetic recording medium including a magnetic recording layer, a medium protective layer, and a lubricating layer in this order on a base, the method comprising:
    a CF bond density measuring step of measuring a CF bond density of a lubricant; and
    a lubricating layer forming step of forming a lubricating layer with the lubricant when the measured CF bond density is $2.0 \times 10^{22}$ to $2.7 \times 10^{22}$ atoms/cm$^3$.

2. The method of manufacturing the perpendicular magnetic recording medium according to claim 1, wherein
    in the CF bond density measuring step,
    an ellipsometer or X-Ray Reflectivity (XRR) is used to measure a film thickness of the lubricating layer, and Fourier Transform Infrared Spectroscopy (FT-IR) or X-ray Photoelectron Spectroscopy (XPS) is used to count a number of CF bonds in a predetermined range of the lubricating layer, and
    the CF bond density is calculated based on the measured film thickness and the counted number of CF bonds.

3. The method of manufacturing the perpendicular magnetic recording medium according to claim 2, wherein the lubricant comprises perfluoropolyether (PFPE).

4. The method of manufacturing the perpendicular magnetic recording medium according to claim 1, wherein the lubricant comprises perfluoropolyether (PFPE).

* * * * *